UNITED STATES PATENT OFFICE.

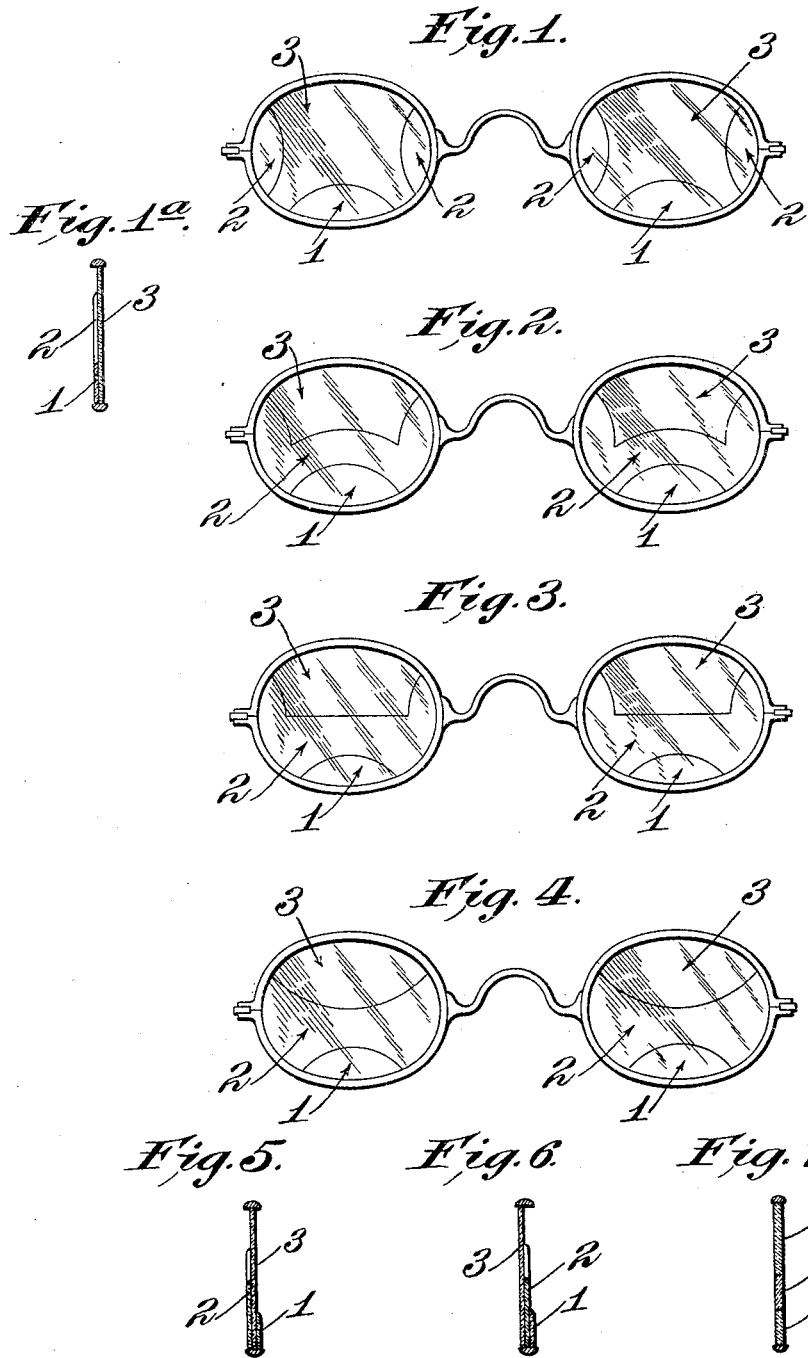

WILLIAM K. KIGHT, OF DEXTER, MISSOURI, ASSIGNOR OF ONE-THIRD TO ROBERT F. JEAN, OF DEXTER, MISSOURI.

LENS FOR EYEGLASSES.

No. 803,908.    Specification of Letters Patent.    Patented Nov. 7, 1905.

Application filed May 11, 1905. Serial No. 259,978.

*To all whom it may concern:*

Be it known that I, WILLIAM K. KIGHT, a citizen of the United States, residing at Dexter, Stoddard county, Missouri, have invented a certain new and useful Improvement in Lenses for Eyeglasses, of which the following is a full, clear, and exact description, such as will enable others skilled in the art to which it appertains to make and use the same, reference being had to the accompanying drawings, forming part of this specification, in which—

Figure 1 is a side elevational view of a pair of eyeglasses, showing my improved lenses therein. Figs. 2, 3, and 4 are similar views showing modified forms of lenses, and Figs. 1ᵃ, 5, 6, and 7 are cross-sectional views showing different forms of lenses.

This invention relates to trifocal lenses for eyeglasses, the object being to construct an intermediate vision or field with upward extensions at its ends, whereby the wearer may have his vision focalized on objects at intermediate distances in glancing laterally or upwardly in an oblique direction. Heretofore bifocal lenses have been made in which the reading field or vision, located at the lower portion of the lens, has been focalized at about fifteen inches, the remaining portion of the lens being either plano or convex, depending upon the condition of the sight of the wearer for long-distance vision; but such field or vision if focalized for long distances is usually focalized at a distance of about twenty feet, so that between the reading vision and the long-distance vision there is a space of some seventeen or eighteen feet, within which range the wearer cannot see objects plainly.

My present invention consists in adding to the bifocal lens—that is, one having a field or vision focalized at ordinary reading distance, say fifteen inches, and a distance-field or vision, focalized, say, at twenty feet—an intermediate field or vision having continuations at the ends of the lens extending above the major axis of the lens, whereby the wearer can, in addition to focalizing his vision on objects within the focal range of this intermediate field or vision, while looking straight ahead, also focalize his vision within the focal range of this field to one side or the other and slightly above the horizontal plane or vision in an oblique direction. This intermediate field or vision will start from the diminishing focal range of the reading field or vision and terminate at the commencement of the long-distance focal range.

In the drawings, 1 indicates a reading field or vision, located in the lower portion of the lens and which is preferably focalized at about fifteen inches, said field or vision being reduced in vertical depth so that it is not in line of sight when walking.

2 indicates what I term a "walking" field or vision, which may be focalized at six or eight feet and which in the center of the lens does not extend above the horizontal line of sight of the major axis of the lens, but whose extremities at the ends of the lens are projected upwardly above the major axis of the lens.

3 is the long-distance field or vision, constituting the major portion above the long axis of the lens, said field or vision being focalized at the usual distance of about twenty feet. This field or vision 3, however, may be a plano-lens, depending upon the condition of the eyesight of the wearer.

In Fig. 1 of the drawings I have shown each lens provided with fields or visions 2 at the ends thereof, while in Figs. 2 and 3 these are connected so that the wearer may look straight ahead through this intermediate field or vision.

Having thus described the invention, what is claimed as new, and desired to be secured by Letters Patent, is—

1. The herein-described lens for eyeglasses, the same consisting of a lens having a short reading field or vision, located in the lower portion of the lens, intermediate fields or visions located at the ends of the lens and extending above the major axis thereof, and a long-distance field or vision constituting the major portion of the lens above its major axis; substantially as described.

2. The herein-described lens for eyeglasses, the same consisting of a short-distance field or vision 1, an intermediate field or vision 2 whose central portion is arranged below the major axis of the lens and whose ends extend above the major axis of the lens, and a long-distance field or vision constituting the principal portion of the lens above its major axis; substantially as described.

3. The herein-described lens for eyeglasses, the same consisting of a lens having a short reading field or vision located in the lower portion of the lens, intermediate fields or visions located at the ends of the lens, and a long-distance field or vision constituting the major portion of the lens above its major axis; substantially as described.

In testimony whereof I hereunto affix my signature, in the presence of two witnesses, this 8th day of May, 1905.

WILLIAM K. KIGHT.

Witnesses:
  F. R. CORNWALL,
  GEORGE BAKEWELL.